United States Patent
Clecak et al.

[15] 3,697,595
[45] Oct. 10, 1972

[54] CONJUGATED NITRO AMINES

[72] Inventors: Nicholas J. Clecak, San Jose; Robert J. Cox, Los Gatos, both of Calif.

[73] Assignee: International Business Machines Corporation, Armonk, N.Y.

[22] Filed: March 31, 1970

[21] Appl. No.: 24,401

[52] U.S. Cl. ............260/566 R, 260/205, 260/566 B, 260/576, 96/1.5
[51] Int. Cl. ............................................C07c 119/00
[58] Field of Search................260/566 R, 566 B, 576

[56] References Cited

UNITED STATES PATENTS

| | | | |
|---|---|---|---|
| 2,155,356 | 4/1939 | Britton et al. | 260/566 |
| 2,303,820 | 12/1942 | Cantrell et al. | 260/566 X |
| 3,369,904 | 2/1968 | Faber | 260/566 X |

OTHER PUBLICATIONS

Beilstein's Handbuch der Organischen Chemie, Vol. 7 pg. 1,388 (1968)

*Primary Examiner*—Leon Zitver
*Assistant Examiner*—Gerald A. Schwartz
*Attorney*—Hanifin and Jancin and Joseph G. Walsh

[57] ABSTRACT

Conjugated nitro amines having the formula:

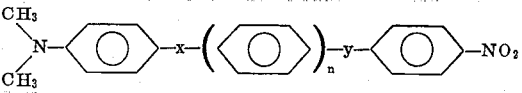

wherein
$x$ is N   N, N   CH, CH   CH—CH   N, or CH CH,
$y$ is CH   CH, CH   N, N   CH—CH   CH, or NH and
$n$ is 0, 1 or 2
have been prepared and found useful as dichroic photoconductors.

4 Claims, No Drawings

CONJUGATED NITRO AMINES

FIELD OF THE INVENTION

This invention is concerned with certain novel compositions of matter, namely conjugated nitro amines having the formula given above, and with their use as dichroic photoconductors.

PRIOR ART

To the best of our knowledge and belief, the compounds of the present invention have never been made before, nor described in the literature. They differ from prior art dichroic photoconductors in that they are not symmetrically substituted, but are unsymmetrically substituted. It has now been found that symmetrical substitution is not necessary for dichroic activity.

SUMMARY OF THE INVENTION

The process of contact reflex reproduction is described in U.S. patent application Ser. No. 668,697, filed Sept. 18, 1967 by Herrick and Shattuck now U.S. Pat. No. 3,598,582. The compounds of the present invention are particularly suitable for use in that process as dichroic photoconductors.

The methods of preparation of the compounds are given below in the Examples. It should be understood that the following Examples are given solely for the purposes of illustration, and are not to be construed as limitations on the invention, many variations of which will occur to those skilled in the art, without departing from the spirit or scope thereof.

EXAMPLE I

N,N-Dimethyl-4-(4-p-nitrostyrylphenylazo)aniline

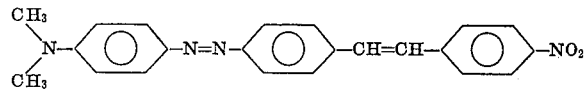

N,N-dimethylaniline was coupled with 4-formylbenzene diazonium chloride as described in J. Chem. Soc. 1173 (1926) and an aldehyde was obtained in 54 percent yield. It melted at 178°-179° after recrystallization from ethanol. The reaction of this aldehyde with the "Wittig Reagent" was carried out as follows.

A slurry of 2.9 g. of the aldehyde (0.079 mole) and 5 g. of p-nitrobenzyltriphenylphosphonium bromide (0.01 mole) in 75 ml. of absolute ethanol was heated dropwise with stirring with a solution of 0.07 g. (0.01 mole) of lithium in 25 ml. of absolute ethanol. The reaction was kept under nitrogen during the addition and for a further 2 hours. Fifty ml. of water was then added to the reaction mixture and it was filtered. The precipitate was washed with 60 percent aqueous ethanol, dried and recrystallized from dimethylformamide. The red solid analyzed as the title compound.

Calcd. for $C_{22}H_{20}N_4O_2$: C, 71.0; H, 5.39; N, 15.1
Found: C, 70.89; H, 5.45; N, 15.16

This new compound had a dichroic ratio on glass of 5 and a $\lambda_{max}$ at 4,700 A.

EXAMPLE II

N,N-Dimethyl-4-(p-nitrocinnamylideneamino)aniline

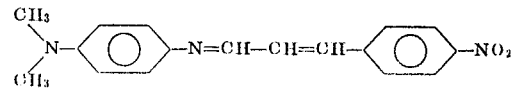

4-Nitrocinnamaldehyde 1.8 g. (Macro Chemie 84 65) and N,N-dimethyl-p-phenylenediamine, 1.4 g. were heated to reflux in 25 ml. of ethanol for one-half hours. The reaction mixture was filtered, washed with ether and acetone then dried. The red crystalline product analyzed as the title compound.

Calcd. for $C_{17}H_{17}N_3O_2$: C, 69.2; H, 5.76; N, 14.2
Found: C, 69.05; H, 5.92; N, 14.23

This new compound had a dichroic ratio on glass of 7 and a $\lambda_{max}$ at 4,500.

EXAMPLE III

N,N-Dimethyl-4(-4-p-nitrophenyl-2,4-butadienyl)aniline

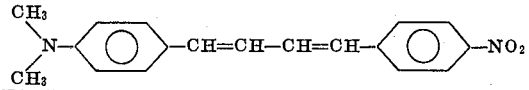

The title compound was prepared by the Wittig reaction between p-dimethylaminocinnamaldehyde I and the "Wittig Reagent," p-nitrobenzyltriphenylphosphonium bromide II. The experimental details for this preparation were: a slurry of 3.1 g. of I and 6.4 g. of II in 75 ml. of absolute ethanol was treated with stirring with 0.08 g. of lithium in 25 ml. of absolute ethanol under a nitrogen atmosphere. Stirring was continued for about 1 hour after the completion of the addition. Fifty ml. of water was added to the reaction mixture and the precipitate filtered. After washing with 60 percent ethanol the yellow solid was recrystallized from 2,2-dioxyethanol. Analysis for the title compound showed the following.

Calcd. for $C_{18}H_{18}N_2O_2$: C, 73.5; H, 6.13; N, 9.54
Found: C, 73.32; H, 6.05; N, 9.53

This compound showed a dichroic ratio of 32 with a $\lambda_{max}$ at 4,300 A.

EXAMPLE IV p-N,N-Dimethylaminocinnamylidene-p-nitrophenylhydrazone

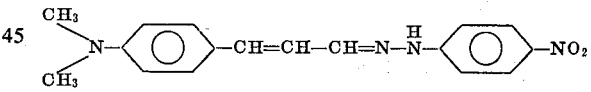

A solution of 8 g. of p-nitrophenylhydrazine and 10 g. of p-dimethylaminocinnamaldehyde in 200 ml. of ethanol was refluxed for 1 hour. The reaction mixture was filtered, washed with acetone and dried. A red solid weighing 0.75 g. was obtained. It analyzed as shown:

Calcd. for $C_{17}H_{18}N_4O_2$: C, 65.79; H, 5.85; N, 18.05
Found: C, 65.69; H, 5.84; N, 17.92

This compound was found to have a dichroic ratio on glass of 4 with a $\lambda_{max}$ at 4,200 A.

EXAMPLE A 4-(p-Dimethylaminobenzylideneamino)4'-(p-nitrocinnamylideneamino)biphenyl

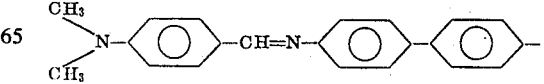
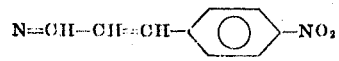

To a solution of 3.68 g. of benzidene in 50 ml. of ethanol was added 0.1 g. of concentrated hydrochloric acid. After warming of the mixture to effect solution, 1.5 g. of p-nitrocinnamaldehyde was added and the reaction mixture heated to reflux for 10 minutes. The resultant precipitate was filtered, washed with ethanol then treated with 10 ml. of sodium bicarbonate solution and 2 ml. of 50 percent sodium hydroxide solution. This was heated to reflux, hot filtered and the precipitate washed with water, ethanol, ether and dried. Dark red crystals of 4-amino-4'-(p-nitrocinnamylideneamino)biphenyl was recovered. This compound had not been prepared before and showed the following analytical results.

Calcd. for $C_{21}H_{17}N_3O_2$: C, 73.45; H, 4.99; N, 12.24
Found: C, 72.90; H, 4.81; N, 12.31

A solution of 0.5 g. of the above amino in 100 ml. of butanol was prepared by heating. To this hot solution was added 3 g. of p-dimethylaminobenzaldehyde and the reaction mixture refluxed for 1 hour. This was hot filtered, the precipitate washed with acetone, then ether and dried. A red solid weighing 0.45 g. was obtained which was shown to be the title compound by elemental analysis.

Calcd. for $C_{30}H_{26}N_4O_2$: C, 75.93; H, 5.52; N, 11.80
Found: C, 75.22; H, 5.45; N, 11.61

This compound showed a dichroic ratio on glass of 34 and a $\lambda_{max}$ at 4,000 A.

EXAMPLE VI 4-(p-dimethylaminocinnamylideneamino)4'-p-nitrocinnamylideneamino)biphenyl

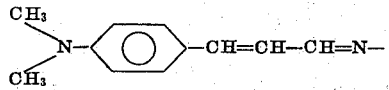
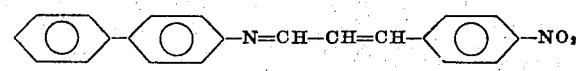

This compound was prepared by heating 0.5 g. of 4-amino-4'-(3-p-nitrocinnamylideneamino)biphenyl and 4 g. of p-dimethylaminocinnamaldehyde in 100 ml. of butanol to reflux for 1 hour. The reaction mixture was filtered and the dark red solid washed with ether, acetone and dried. It weighed 0.7 g. and was shown to be the title compound by analysis.

Calcd. for $C_{32}H_{28}N_4O_2$: C, 76.78; H, 5.64; N, 11.19
Found: C, 75.80; H, 5.73; N, 10.53

It had a dichroic ratio of 17 on glass with a $\lambda_{max}$ of 4,100 A.

What is claimed is:

1. A compound selected from the group consisting of N,N-Dimethyl-4-(p-nitrocinnamylideneamino)aniline, N,N-Dimethyl-4-(-4-p-nitrophenyl-2,4-butadienyl)aniline, and p-N,N-Dimethyl-aminocinnamylidene-p-nitrophenylhydrazone.

2. A compound as claimed in claim 1, namely N,N-Dimethyl-4-(p-nitrocinnamylideneamino)aniline.

3. A compound as claimed in claim 1, namely N,N-Dimethyl-4-(-4-p-nitrophenyl-2,4-butadienyl)aniline.

4. A compound as claimed in claim 1, namely p-N,N-Dimethyl-aminocinnamylidene-p-nitrophenylhydrazone.

* * * * *

PO-1050
(5/69)

UNITED STATES PATENT OFFICE
CERTIFICATE OF CORRECTION

Patent No. 3,697,595          Dated October 10, 1972

Inventor(s) Nicholas J. Clecak et al

It is certified that error appears in the above-identified patent and that said Letters Patent are hereby corrected as shown below:

In the Abstract following the word "wherein":

change "x is N N,N CH,CH CH-CH N, or CH CH," to --x is N=N, N=CH, CH=CH-CH=N, or CH=CH,--.

change "y is CH CH, CH N, N CH-CH CH, or NH and" to --y is CH=CH, CH=N, N=CH-CH=CH, or NH and--.

Signed and sealed this 24th day of April 1973.

(SEAL)
Attest:

EDWARD M. FLETCHER, JR.          ROBERT GOTTSCHALK
Attesting Officer                 Commissioner of Patents